United States Patent
Ovize et al.

(12) 
(10) Patent No.: US 9,482,279 B2
(45) Date of Patent: Nov. 1, 2016

(54) SPACER FOR ROLLING BEARING, NOTABLY USED IN A WIND TURBINE

(75) Inventors: Pascal Ovize, Chitry le Fort (FR); Jean-Baptiste Magny, Chevannes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 287 days.

(21) Appl. No.: 14/117,545

(22) PCT Filed: May 13, 2011

(86) PCT No.: PCT/EP2011/057743
§ 371 (c)(1),
(2), (4) Date: Jun. 30, 2015

(87) PCT Pub. No.: WO2012/155946
PCT Pub. Date: Nov. 22, 2012

(65) Prior Publication Data
US 2015/0345559 A1    Dec. 3, 2015

(51) Int. Cl.
| | | |
|---|---|---|
| F16C 33/37 | (2006.01) | |
| F16C 19/38 | (2006.01) | |
| F16C 19/40 | (2006.01) | |
| F16C 33/66 | (2006.01) | |
| F16C 33/78 | (2006.01) | |

(52) U.S. Cl.
CPC ........... *F16C 33/3706* (2013.01); *F16C 19/38* (2013.01); *F16C 19/40* (2013.01); *F16C 33/6614* (2013.01); *F16C 33/7836* (2013.01); *F16C 2300/14* (2013.01); *F16C 2360/31* (2013.01)

(58) Field of Classification Search
CPC .... F16C 19/38; F16C 19/40; F16C 33/3706; F16C 2360/31; F16C 33/7836; F16C 33/6614; F16C 2300/14; F16C 33/6681; F16C 33/513; F16C 19/362
USPC ....... 384/513, 551, 590, 619, 621–622, 527, 384/623; 416/131, 147
See application file for complete search history.

(56) References Cited

U.S. PATENT DOCUMENTS

| | | | | |
|---|---|---|---|---|
| 3,275,391 A | * | 9/1966 | Blais | F16C 19/362 384/447 |
| 3,517,975 A | * | 6/1970 | Davidson | F16C 19/26 384/619 |
| 4,479,683 A | * | 10/1984 | Kanamaru | F16C 19/362 384/619 |
| 4,687,345 A | * | 8/1987 | Geka | F16C 29/065 384/44 |
| 4,896,974 A | * | 1/1990 | Shimizu | F16C 19/362 384/44 |

(Continued)

FOREIGN PATENT DOCUMENTS

| | | | | |
|---|---|---|---|---|
| DE | 102010012168 A1 | * | 9/2011 | .......... F16C 33/3706 |
| DE | 102011002898 A1 | * | 7/2012 | .............. F16C 19/38 |

(Continued)

*Primary Examiner* — Marcus Charles
(74) *Attorney, Agent, or Firm* — Bryan Peckjian; SKF USA Inc. Patent Dept.

(57) ABSTRACT

The spacer is adapted for a rolling bearing comprising an inner ring, an outer ring and at least one row of angular contact rollers disposed between raceways and guiding faces provided on the rings. The spacer comprises opposite inner and outer parts 13, 14 and opposite lateral flanges 15, 16 respectively adapted to come into contact with the raceways and the guiding faces of the rings. Said inner and outer parts and/or said lateral flanges comprise at least a contact surface 14a, 14b; 16a with one of the rings and a concave recess 14c; 16b, 16c, 16d directed outwards towards said ring.

5 Claims, 5 Drawing Sheets

(56) References Cited

U.S. PATENT DOCUMENTS

| | | | | |
|---|---|---|---|---|
| 5,954,609 A * | 9/1999 | Fecko | | F16C 19/362 |
| | | | | 384/619 |
| 7,073,948 B2 * | 7/2006 | Neder | | F16C 19/364 |
| | | | | 384/447 |
| 7,438,474 B2 * | 10/2008 | Chen | | F16C 29/041 |
| | | | | 384/47 |
| 8,282,286 B2 * | 10/2012 | Kanai | | F16C 19/362 |
| | | | | 384/447 |
| 2008/0213095 A1 * | 9/2008 | Bech | | F03D 1/0658 |
| | | | | 416/131 |
| 2008/0218006 A1 * | 9/2008 | Dimascio | | F03D 11/0008 |
| | | | | 310/425 |
| 2010/0143136 A1 * | 6/2010 | Daniels | | F03D 7/0224 |
| | | | | 416/147 |
| 2010/0144483 A1 * | 6/2010 | Aiyakkannu | | F03D 1/00 |
| | | | | 475/225 |
| 2011/0235953 A1 * | 9/2011 | Wheals | | F03D 11/0008 |
| | | | | 384/100 |

FOREIGN PATENT DOCUMENTS

| | | | | |
|---|---|---|---|---|
| EP | 2065604 A1 | 6/2009 | | |
| JP | 2000291668 A * | 10/2000 | | |
| JP | 2000314418 A * | 11/2000 | | |
| JP | 2010270703 A * | 12/2010 | | |
| WO | WO 2009020087 A1 * | 2/2009 | | F16C 19/38 |
| WO | WO 2009062466 A2 * | 5/2009 | | F16C 19/362 |
| WO | WO 2010037370 A1 * | 4/2010 | | F03D 11/0008 |
| WO | 20110013536 A1 | 2/2011 | | |
| WO | WO 2011050838 A1 * | 5/2011 | | F16C 43/045 |

\* cited by examiner

SPACER FOR ROLLING BEARING, NOTABLY USED IN A WIND TURBINE

CROSS-REFERENCE

This application is the U.S. National Stage of International Application No. PCT/EP2011/057743 filed on May 13, 2011, the content of which is hereby incorporated by reference in its entirety.

FIELD OF THE INVENTION

The present invention relates to the field of rolling bearings, in particular rolling bearings having an inner ring and an outer ring with one or more rows of contact rollers therebetween.

The invention relates more particularly to the field of large-diameter rolling bearings adapted to be used in a wind turbine.

BACKGROUND OF THE INVENTION

In such application, rolling bearings are used to angularly orient the rotor of the turbine according to the direction of the wind, and to orient the blades of the turbine around their longitudinal axes. Such rolling bearings are loaded mainly by a stress, both axially and radially, often with a relatively strong load.

A rolling bearing for a wind turbine comprise two concentric inner and outer rings, at least a row of oblique contact rollers arranged between raceways and guiding faces provided on said rings, and a plurality of spacers disposed circumferentially between the rollers. Each spacer generally comprises two opposite cavities having a concave profile adapted to the rollers and delimited axially by lateral flanges, and two opposite inner and outer planar surfaces.

Said planar surfaces and lateral flanges of each spacer may respectively come into contact with the raceways and the guiding faces of the rings. Such contacts between the spacers and the rings induce an increase of the friction torque of the rolling bearing.

It is a particular object of the present invention to provide a spacer for rolling bearing adapted to reduce its friction contribution and which is simple to manufacture and economic.

SUMMARY OF THE INVENTION

In one embodiment, the spacer for rolling bearing comprising an inner ring, an outer ring and at least one row of angular contact rollers disposed between raceways and guiding faces provided on the rings, comprises opposite inner and outer parts and opposite lateral flanges respectively adapted to come into contact with the raceways and the guiding faces of the rings. Said inner and outer parts and/or said lateral flanges comprise at least a contact surface with one of the rings and at least a concave recess directed outwards towards said ring.

The spacer may comprise two opposite faces having a concave profile adapted to the rollers. Advantageously, the recess extends from one face to the other. Preferably, the opposite faces are delimited axially by the lateral flanges and connected to the inner and outer parts.

In one embodiment, each face comprises a recess extending from the inner part to the outer part. The spacer may comprise a through-hole putting the faces into communication.

In one preferred embodiment, the inner and outer parts and/or the lateral flanges each comprise at least a contact surface with one of the rings and at least a recess directed towards said ring.

In one embodiment, the inner and outer parts each comprise two contact surfaces and a recess disposed therebetween. Alternatively or in combination, the lateral flanges may each comprise one contact surface and a recess in a form of a groove formed onto said surface. Advantageously, the lateral flanges each further comprise additional recesses located on the both sides of the contact surface.

In one embodiment, the spacer is formed in one part from metal or from polymer material.

In another aspect of the invention, a rolling bearing comprises an inner ring, an outer ring, at least one row of angular contact rollers disposed between raceways and guiding faces provided on the rings, and a plurality of spacers as previously defined and disposed circumferentially between the rollers.

In one preferred embodiment, the recesses of the spacers are filled with lubricant.

The rolling bearing as previously defined may be particularly useful as a bearing for a wind turbine comprising a mast holding a nacelle where blades are installed, in particular for rotating the nacelle with respect to the mast and/or for rotating/pitching each blade around its longitudinal axis.

BRIEF DESCRIPTION OF THE FIGURES

The present invention and its advantages will be better understood by studying the detailed description of a specific embodiment given by way of non-limiting example and illustrated by the appended drawings on which.

DETAILED DESCRIPTION OF THE INVENTION

Figure 1:
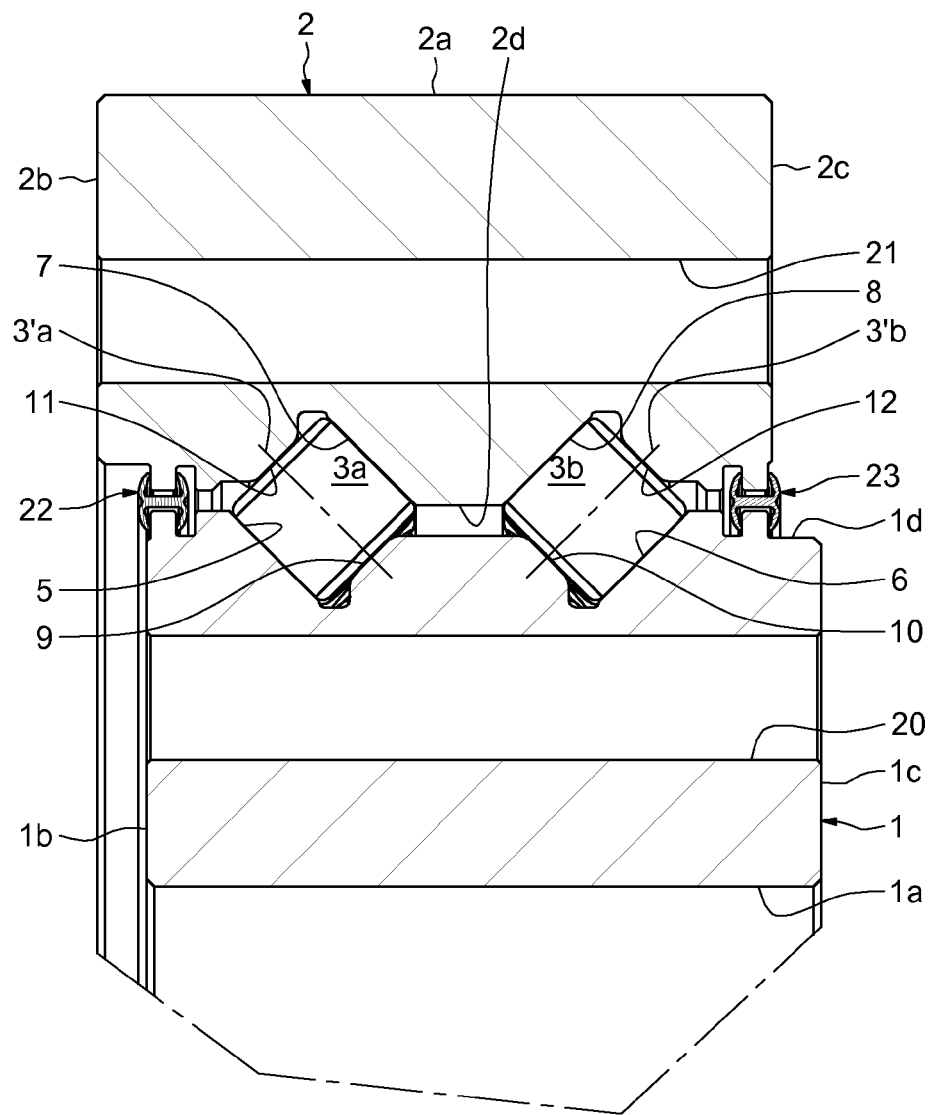
FIG. 1 is a half section of a rolling bearing according to an example of the invention.
Figure 2:
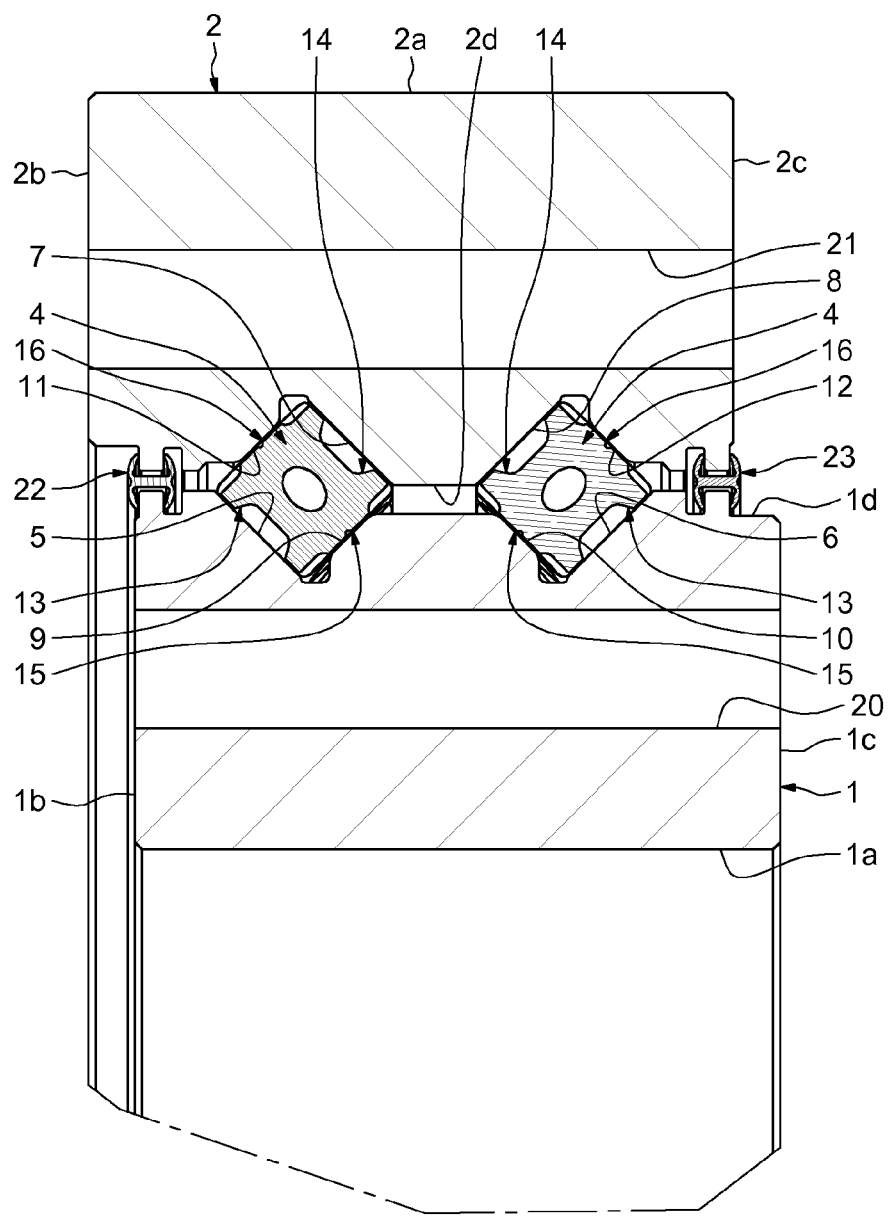
FIG. 2 is a half section of the rolling bearing of FIG. 1 according to another section plan.

The rolling bearing as illustrated on the FIGS. 1 and 2 is a large-diameter rolling bearing comprising an inner ring 1 and an outer ring 2 between which are housed two rows of oblique or angular contact rollers 3a and 3b. The rolling bearing also comprises a plurality of spacers 4 disposed circumferentially between the rollers 3a, 3b to maintain the circumferential spacing between them.

The inner and outer rings 1, 2 are concentric and extend axially along the bearing rotation axis (not shown) of the rolling bearing. The rings 1, 2 are of the solid type. A "solid ring" is to be understood as a ring obtained by machining with removal of material (by machining, grinding) from metal tube stock, bar stock, rough forgings and/or rolled blanks.

The rollers 3a, 3b are identical with one another and each comprise an exterior rolling surface and opposite end transverse faces delimiting axially the rolling surface. In the illustrated embodiment, the rolling surfaces have a cylindrical profile. Alternatively, the rolling surfaces may have a spherical profile or a logarithmic profile. For each row, the rotation axes 3'a, 3'b of the rollers converge in one single point located on the longitudinal axis of the bearing, and are disposed at a determined angle with respect to the bearing axis. In the illustrated embodiment, the rotation axes 3'a, 3'b of the rollers of the two rows are arranged at an angle of 90° to each other, and of approximately of 45° to the bearing axis. The angle between the rotation axis 3'a, 3'b of each roller and the bearing axis may be comprised for example between 20° and 70°.

The inner ring 1 has a bore 1a of cylindrical shape designed to be fixed to a chassis or to a structure of a machine (not shown) and delimited by opposite radial lateral surfaces 1b, 1c. The inner ring 1 also comprises a stepped exterior cylindrical surface 1d onto which first and second annular raceways 5, 6 are formed. The raceways 5, 6 are mutually symmetric with respect to a transverse radial plane passing through the centre of the rolling bearing. Each raceway 5, 6 extend obliquely inwards from the exterior cylindrical surface 1d and has a frustoconical shape. Each raceway 5, 6 has in cross section a straight internal profile in contact with the rolling surfaces of the rollers 3a, 3b.

The outer ring 2 comprises an outer cylindrical surface 2a delimited by opposite radial lateral surfaces 2b, 2c. The outer ring 2 also comprises a stepped annular bore 2d of cylindrical shape into which first and second raceways 7, 8 are formed. The raceways 7, 8 are mutually symmetric with respect to the radial plane passing through the centre of the rolling bearing. The raceways 7, 8 are respectively parallel to the raceways 5, 6. Each raceway 7, 8 extends obliquely outwards from the bore 2d and has a frustoconical shape. Each raceway 7, 8 has in cross section a straight internal profile in contact with the rolling surfaces of the rollers 3a, 3b. The raceways 5, 6 of the inner ring and the raceways 7, 8 of the outer ring mutually face each other while at the same time being symmetric with regard to the rotation axis 3'a, 3'b of the rollers 3a, 3b.

The inner ring 1 also comprises annular guiding faces 9, 10 formed onto the exterior surface 1d and which may be in axial contact with the end faces of the rollers with regard to the rotation axes 3'a, 3'b. The guiding faces 9, 10 are mutually symmetric with respect to the radial plane passing through the centre of rolling bearing. Each guiding face 9, 10 is straight and disposed perpendicular to the corresponding raceway 5, 6 and is connected to the edge of small diameter of said raceway by an annular concave fillet. Each guiding face 9, 10 extends obliquely outwards from said fillet and is connected to the exterior surface 1d of the inner ring. The guiding faces 9, 10 extend radially relative to the rotation axis 3'a, 3'b of the rollers. Each guiding faces 9, 10 and the associated raceway 5, 6 delimit a V-shaped groove directed radially outwards.

The outer ring 2 also comprises guiding faces 11, 12 formed into the bore 2d and which may be in axial contact with the opposite end faces of the rollers 3a, 3b with regard to the rotation axes 3'a, 3'b. The guiding faces 11, 12 are mutually symmetric with respect to the radial plane passing through the centre of rolling bearing. The guiding faces 11, 12 and the guiding faces 9, 10 mutually face each other and are respectively parallel. Each guiding face 11, 12 is straight and disposed perpendicular to the corresponding raceway 7, 8 and is connected to the edge of large diameter of said raceway by an annular concave fillet. Each guiding face 11, 12 extends obliquely inwards from said fillet and is connected to the bore 2d of the inner ring. Each guiding face 11, 12 extend radially relative to the rotation axis 3'a, 3'b of the rollers. Each guiding face 11, 12 and the associated raceway 7, 8 delimit a V-shaped groove directed radially inwards.

The raceway 5 and the guiding face 9 of the inner ring define together with the raceway 7 and the guiding face 11 of the outer ring a first annular space inside which the row of rollers 3a is disposed. Each roller 3a arranged between the raceways 5, 7 is maintained laterally in position by the guiding faces 9, 11 to avoid a skewing or tilting of said roller with respect to the raceways. Each guiding face 9, 11 form a flank having a direct contact surface with the associated end face of the rollers 3a to have a slight relative sliding between the end faces of rollers and the inner and outer rings 1, 2.

Similarly, the raceway 6 and the guiding face 10 of the inner ring define together with the raceway 8 and the guiding face 12 of the outer ring a second annular space inside which the row of rollers 3b is disposed. The arrangement of the rollers 3b with respect to the guiding faces 10, 12 is the same that the one previously described for the rollers 3a and the guiding faces 9, 11.

The spacers 4 are identical with one another and each placed between two consecutive rollers 3a, 3b of each row. The spacers 4 may be made in one part from metal. Alternatively, the spacers 4 may be made from polymer material such as polyamide, for instance by moulding.

Figure 3:
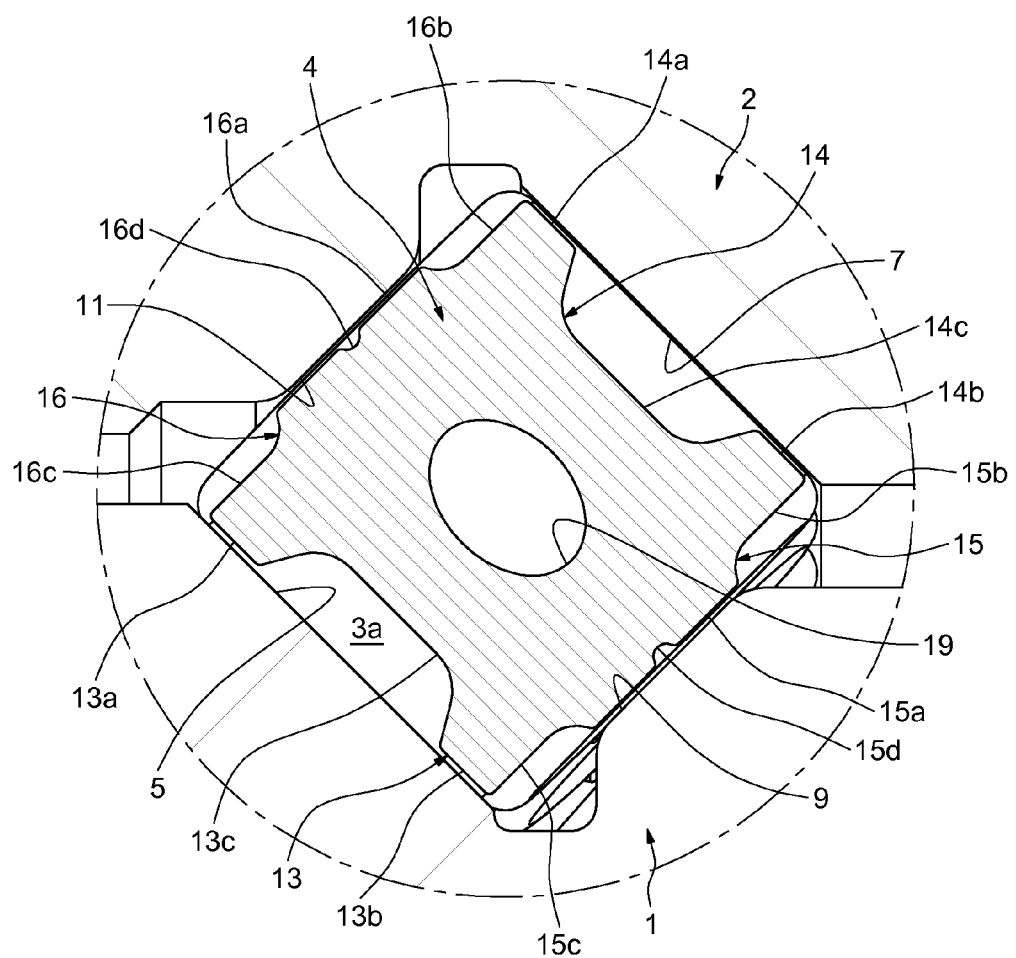
FIG. 3 is a part section on a larger scale of FIG. 2.
Figure 4:
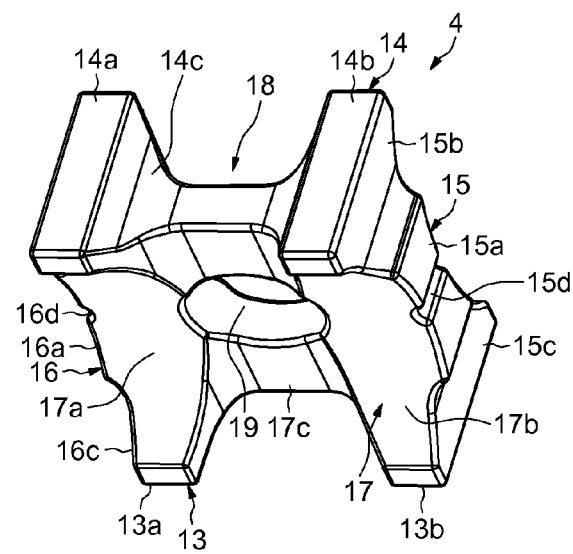
FIG. 4 is a perspective view of a spacer of the rolling bearing of FIGS. 1 and 2.

As shown on FIGS. 2 to 4, each spacer 4 comprises two opposite inner and outer parts 13, 14 coming into contact with the facing raceways of the inner and outer rings 1 and 2, and two opposite lateral flanges 15, 16 coming into contact with the opposite guiding faces of said rings. Each spacer 4 also comprises two opposite faces 17, 18 adapted to receive two consecutive rollers. With regard to the rotation axes of said rollers, the faces 17, 18 are delimited axially by the lateral flanges 15, 16. The faces 17, 18 are delimited transversally by the inner and outer parts 13, 14.

As shown on FIG. 3, for the row of rollers 3a, the inner and outer parts 13, 14 of each spacer come into contact with the inner and outer raceways 5, 7 and the lateral flanges 15, 16 come into contact with the guiding faces 9, 11. The raceways 5, 7 and the guiding faces 9, 11 each form a flank having a direct contact surface with the associated part 13, 14 or flange 15, 16 to have a slight relative sliding between each spacer 4 and the rings 1, 2. In order to limit the induced friction torque of the spacers 4, a slight clearance is foreseen between each spacer and the raceways 5, 7 and the guiding faces 10, 12 of the rings. The arrangement of the spacers 4 for the row of rollers 3b with respect to the raceways 6, 8 and to the guiding faces 10, 12 of the rings is the same that the one described for row of rollers 3a.

As shown on FIGS. 3 and 4, the outer part 14 of each spacer comprises two identical and separate planar contact surfaces 14a, 14b bearing against the associated raceway of the outer ring 2 and a concave recess 14c extending therebetween and which faces said raceway while remaining distant from the latter. In the illustrated embodiment, the recess 14c has in cross-section a U-shape. The recess 14c extends transversally from a longitudinal edge of the contact surface 14a to a facing longitudinal edge of the other contact surface 14b, and longitudinally from the face 17 to the other face 18.

With the concave recess 14c, the friction contacts between the outer part 14 of each spacer and the associated raceway of the outer ring 2 are reduced. Besides, the recess 14c advantageously acts as lubricant reservoir for lubricating the contact surfaces 14a, 14b of the outer part, the associated raceway of the outer ring 2 and the rolling surfaces of the rollers 3a and 3b, the lubricant emerging from the recess directly onto said contact and rolling surfaces and said raceway. The lubricant used (not shown) may be for example grease or oil.

Since the inner and outer parts 13, 14 of each spacer are identical in the illustrated embodiment, only one of them is described here, it being understood that the references "a, b, c" previously used for the outer part 14 are also used for the identical elements of the inner part 13. For the same reasons, only one of lateral flanges 15, 16 will be described, it being understood that the same references "a, b, c, d" are used for the identical elements of the two flanges.

The lateral flange 15 comprises a central planar contact surface 15a bearing against the associated guiding face of the inner ring, two identical concave recesses 15b, 15c which face said ring while remaining distant from the latter, and a groove 15d provided on the contact surface 15a. The distance separating the contact surfaces 15a and 16a of the two flanges 15, 16 is substantially equal to the length of the rollers 3a, 3b.

The recess 15b extends from a first edge of the contact surface 15a to a longitudinal edge of the contact surface 14b of the outer part 14 which is opposite to the longitudinal edge of said surface connected to the recess 14c. The recess 15c extends from a second opposite edge of the contact surface 15a to a longitudinal edge of the contact surface 13b which is opposite to the longitudinal edge of said surface connected to the recess 13c. The recesses 15b, 15c extend longitudinally from the face 17 to the other face 18. The distance separating the two edges of the contact surface 15a is substantially equal to the length of the associated guiding face of the inner ring. The groove 15d is directed outwards and faces said guiding face while remaining distant from the latter. The groove 15d extends longitudinally from the face 17 to the other face 18 and has in cross-section a concave internal profile in the shape of a semi-circle.

As shown on FIG. 3, for the row of rollers 3a, the contact surface 15a of the lateral flange 15 comes into contact with the guiding face 9 of the inner ring 1, and the recess 15c faces the concave fillet which connects said guiding face and the raceway 5 while remaining distant from said fillet. The recess 15b is oriented towards the exterior surface 1d of the inner ring.

With the concave recess 15c and the concave groove 15d, the friction contacts between the lateral flange 15 and the inner ring 1 are reduced. Besides, the recesses 15b, 15c and the groove 15d advantageously act as lubricant reservoirs for lubricating the contact surface 15a, the guiding face 9 of the inner ring and the end faces of the rollers. The lubricant (not shown) emerges from the recesses 15b, 15c and the groove 15d directly onto the contact surface 15a, the guiding face 9 and the end faces of the rollers.

For the row of rollers 3a, the contact surface 16a of the lateral flange 16 bears against the guiding face 11 of the outer ring 2, and the recess 16b faces the concave fillet which connects said guiding face and the raceway 7 while remaining distant from said fillet. The recess 16c is oriented towards the bore 2d of the outer ring. The recesses 16b, 16c and the groove 16d also act as reservoirs filled with lubricant (not shown).

Since the faces 17, 18 of each spacer are identical in the illustrated embodiment, only one of them is described here, it being understood that the same references "a, b, c" are used for the identical elements of the two faces.

Figure 5:
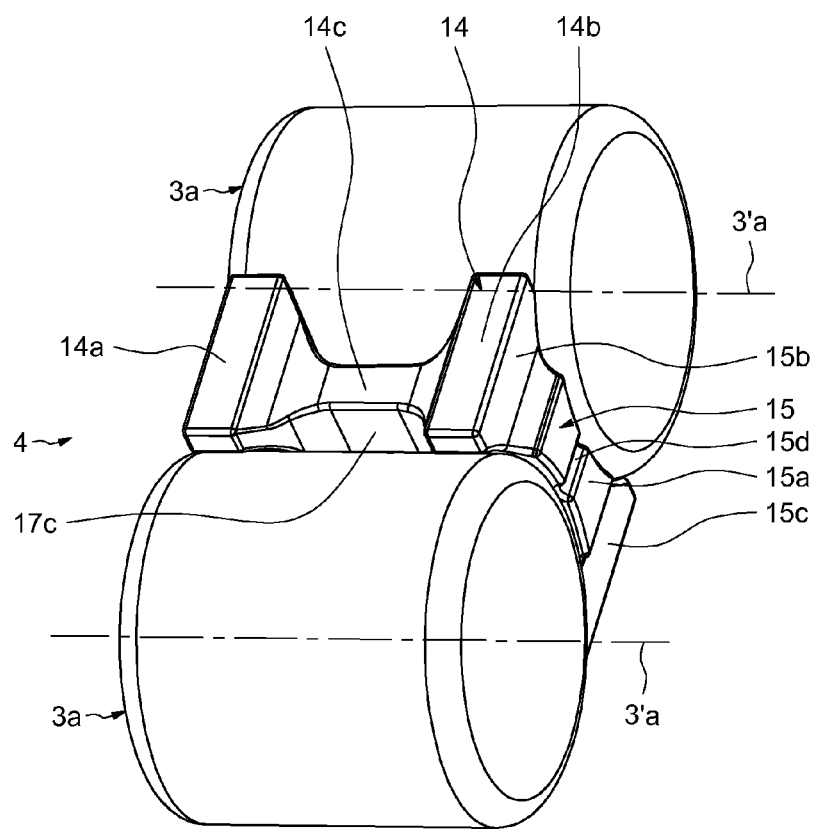
FIG. 5 is a perspective view of the spacer of FIG. 4 with two associated rollers.
Figure 6:
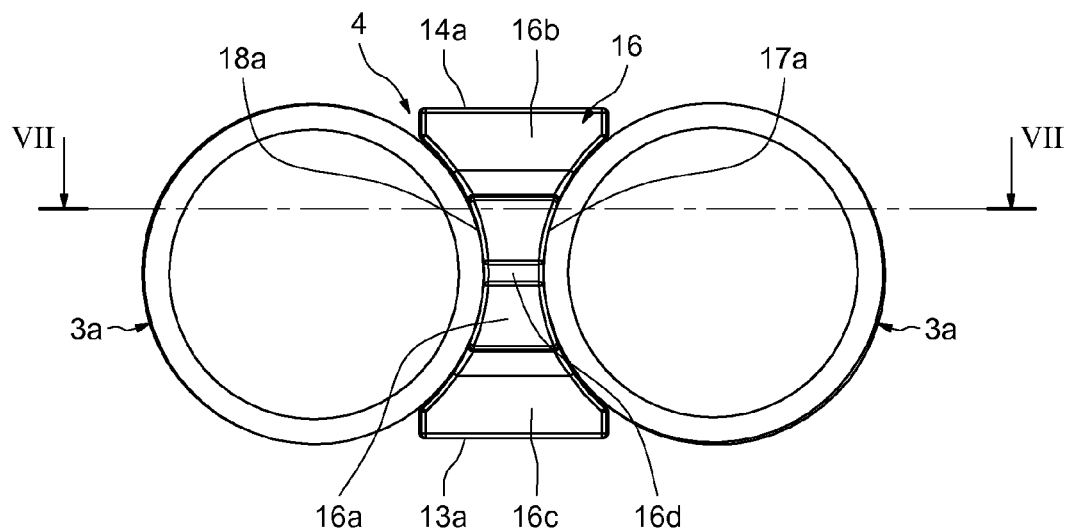
FIG. 6 is a side view of FIG. 5.
Figure 7:
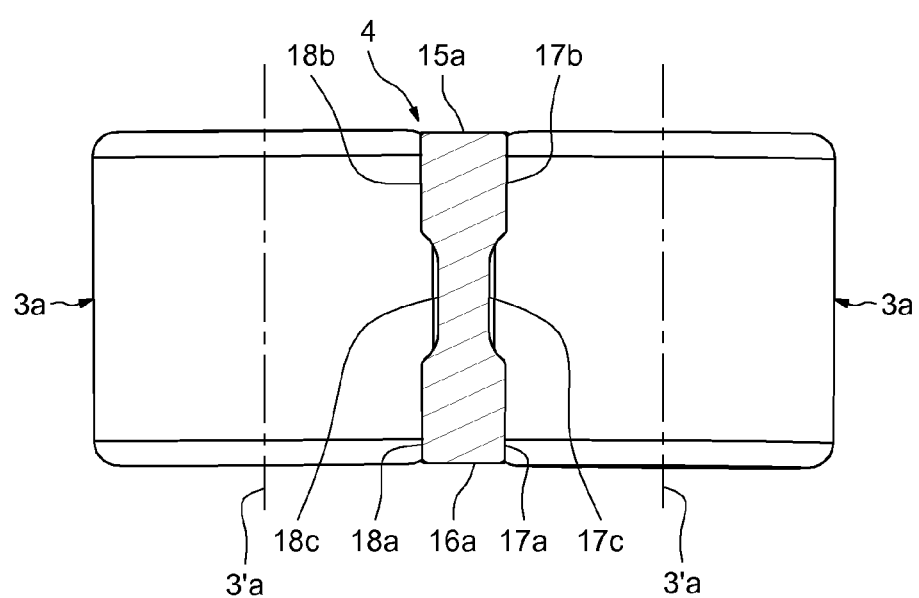
FIG. 7 is a view in section on VII-VII of FIG. 6.

As shown on FIGS. 4 and 5, the face 17 comprises two identical and separate concave contact surfaces 17a, 17b having the shape of coaxial cylinder segments and a profile corresponding to the profile of the rolling surface of the associated roller 3a. The axis of the cylinder segments of the contact surfaces 17a, 17b is parallel to the axis of the cylinder segments of the contact surfaces 18a, 18b. Each circumferential end of each concave contact surfaces 17a, 17b is extended by a plane surface (not referenced) connected to a transversal edge of the associated planar contact surface 13a, 14a, 13b, 14b. The face 17 also comprises a concave recess 17c extending between said contact surfaces and which faces the roller 3a while remaining distant from the rolling surface of the latter. In the illustrated embodiment, the recess 17c has in cross-section a U-shape. The recess 17c extends transversally from a longitudinal edge of the contact surface 17a to a facing longitudinal edge of the other contact surface 17b. The recess 17c extends from the recess 13c of the inner part 13 to the recess 14c of the outer part 14. A joint edge of the recess 17c and the recess 14c is offset inwards with regard to the contact surfaces 14a, 14b of the outer part 14 and to the circumferential ends of the contact surfaces 17a, 17b of the face 17. Similarly, a facing joint edge of the recess 17c and the recess 13c is offset inwards with regard to the contact surfaces 13a, 13b of the inner part 13 and to the circumferential ends of the contact surfaces 17a, 17b of the face 17.

With the concave recess 17c, the friction contacts between the face 17 of each spacer and the associated roller are reduced. Besides, the recess 17c advantageously acts as lubricant reservoir for lubricating the concave contact surfaces 17a, 17b of the face and the rolling surface of the roller, the lubricant (not shown) emerging from the recess 17c directly onto said contact and rolling surfaces. Besides, the lubricant emerging from the recess 17c may be moved outward by centrifugal effect and reach the planar contact surfaces 14a, 14b of the outer part 14 and the associated raceway of the outer ring 2.

Each spacer 4 further comprises a through-hole 19 made inside its thickness, which opens onto the faces 17, 18 and put said faces into communication. On each face the through-hole 19 opens onto the recess 17c, 18c and the facing longitudinal edges of the contact surfaces 17a, 17b and 18a, 18b. Some lubricant (not shown) is disposed inside the through-hole 19, said hole acting as lubricant reservoir for lubricating the rolling surfaces of the two rollers associated to each spacer and the associated concave contact surfaces. The through-hole 19 allows the lubricant contained to emerge directly onto the rolling surface of each roller and the concave contact surfaces.

Otherwise, the recesses 15b to 15d of the lateral flange 15 of the spacer open onto the opposite concave contact surfaces 17b, 18b of the faces. Similarly, the recess 16b to 16d of the lateral flange 16 open onto the opposite concave contact surfaces 17a, 18a of said faces. Hence, the lubricant contained into the above-mentioned recesses may also emerge directly onto the concave contact surfaces of the faces 17, 18 and the end faces and the rolling surfaces of the associated rollers.

For each spacer 4, the presence of the recesses on the inner and outer parts 13, 14 and on the lateral flanges 15, 16 makes it possible to reduce the friction contacts with the rings, and to have a significant reserve of lubricant closed to the rollers 3a, 3b and to the raceways and the guiding faces of the rings. The friction contribution of each spacer 4 with regard to the inner and outer rings is thus reduced.

Otherwise, the presence of the recesses 17c, 18c on each spacer makes it possible to reduce the friction contacts with the rollers and to have a significant reserve of lubricant closed to the concave contact surfaces 17a, 17b and 18a, 18b and the rolling surfaces of said rollers. The friction contribution of each spacer 4 with regard to the rollers is thus reduced. Alternatively, it may however be possible to not foresee the recesses 17c, 18c on the spacers.

The general structure of each spacer 4 is lightened by the recesses. A weight reduction for each spacer is obtained. In the illustrated embodiment, each spacer 4 has a first symmetry plane passing through the grooves 15d, 16d of the lateral flanges and parallel to the planar contact surfaces of the inner and outer parts 13 and 14, a second symmetry plane passing through the recesses 13c, 14c and perpendicular to the first plane, and a third symmetry plane passing through the recesses 17c, 18c and parallel to the planar contact surfaces of the lateral flanges 15 and 16.

For the introduction of the rollers 3a, 3b and the associated spacers 4 into the first and the second annular spaces defined between the inner and outer rings 1 and 2, said outer ring comprises two filling orifices (not shown) each extending radially from the outer cylindrical surface 2a and opening into one of the annular spaces delimited by the raceways and the guiding faces. The outer ring also comprises two plugs closing the filling orifices and each comprising two planar surfaces which respectively replace locally the raceway and the guiding face of the outer ring.

As shown on FIGS. 1 and 2, the inner and outer rings 1, 2 further respectively comprise axial holes 20, 21 for fixing the two rings to two parts of a machine which can rotate one with respect to the other by virtue of the rolling bearing.

The rolling bearing further comprises two annular seals 22, 23 positioned radially between the inner and outer rings 1, 2. The seal 22 is mounted axially between the rollers 3a and the radial surface 2b of the outer ring 2. The seal 23 is positioned axially between the rollers 3b and the radial surface 1c of the inner ring 1. In the disclosed embodiment, the seal 23 is identical to the seal 22 and is positioned symmetrically with respect to the latter with regard to the radial plane passing through the center of the rolling bearing. Alternatively, the seal 23 may be different from the seal 22 with a different shape. A closed space is defined between the rings 1, 2 and the seals 22, 23 in which the rollers 3a, 3b are housed so as to be protected against polluting elements. In the disclosed embodiment, the seals 22 and 23 have in cross-section the overall shape of a H.

Although the invention has been illustrated on the basis of a rolling bearing having a double row of oblique contact rollers, it should be understood that the invention can be applied to bearings having a simple row of rollers or at least three rows of rollers. Otherwise, in the illustrated embodiments, the rolling bearings are O-type bearings. Alternatively, it may also be possible to foresee X-type rolling bearings.

Furthermore, the inner ring and/or the outer ring may comprise gearing teeth on their outer periphery, so as to be connected to driving gears for instance connected to the output shaft of a motor. In another embodiment, the inner ring and/or the outer ring may be connected to a jack, for example a hydraulic or pneumatic jack.

Thanks to the invention, the friction of the rolling bearing is reduced. This is particularly advantageous in the case of a wind turbine comprising actuation means for changing the pitch of the blades, because it allows to downsize these actuation means since less power is required to pitch the blades, and even to reduce the response time of this pitching action, with, as a consequence, an improved overall efficiency of the wind turbine.

The invention claimed is:
1. A spacer for a rolling bearing, the roller bearing including an inner ring, an outer ring, at least one row of angular contact rollers disposed between raceways and guiding faces provided on the rings, and the spacer comprising:
opposite inner and outer parts and opposite lateral flanges respectively adapted to come into contact with the raceways and the guiding faces of the rings, the inner and outer parts and/or the lateral flanges providing at least a contact surface with one of the rings and at least a concave recess directed outwards towards the ring,
wherein the recess extends from one face to the other,
wherein the opposite faces are delimited axially by the lateral flanges and connected to the inner and outer parts,
wherein each face further comprises a recess extending from the inner part to the outer part,
further comprising a through-hole aligning the faces into communication,
wherein the inner and outer parts and/or the lateral flanges each includes at least a contact surface with one of the rings and at least a recess directed towards the ring,
wherein the inner and outer parts each include two contact surfaces and a recess disposed therebetween,
wherein the lateral flanges each include one contact surface and a recess in a form of a groove formed onto the surface, and
wherein the lateral flanges each further comprise additional recesses located on the both sides of the contact surface.

2. The spacer according to claim 1, further comprising two opposite faces having a concave profile adapted to the rollers.

3. The spacer according to claim 1, further comprising being formed from metal or from a polymer material.

4. A rolling bearing comprising:
an inner ring,
an outer ring,
at least one row of angular contact rollers disposed between raceways and guiding faces provided on the rings, and
a plurality of spacers disposed circumferentially between the rollers and providing;
opposite inner and outer parts and opposite lateral flanges respectively adapted to come into contact with the raceways and the guiding faces of the rings, the inner and outer parts and/or the lateral flanges providing at least a contact surface with one of the rings and at least a concave recess directed outwards towards the ring,
wherein the recess extends from one face to the other,
wherein the opposite faces are delimited axially by the lateral flanges and connected to the inner and outer parts,
wherein each face further comprises a recess extending from the inner part to the outer part,
further comprising a through-hole aligning the faces into communication,
wherein the inner and outer parts and/or the lateral flanges each includes at least a contact surface with one of the rings and at least a recess directed towards the ring,
wherein the inner and outer parts each include two contact surfaces and a recess disposed therebetween,
wherein the lateral flanges each include one contact surface and a recess in a form of a groove formed onto the surface, and wherein the lateral flanges each further comprise additional recesses located on the both sides of the contact surface.

5. The rolling bearing according to claim 4, wherein the recesses of the spacers are filled with lubricant.

\* \* \* \* \*